Aug. 21, 1962 W. C. MILLER 3,050,627
NUCLEAR ELECTROMAGNETIC RESONATOR
Filed Nov. 9, 1959 8 Sheets-Sheet 1

WESLEY C. MILLER
INVENTOR

BY
ATTORNEY

Aug. 21, 1962 W. C. MILLER 3,050,627
NUCLEAR ELECTROMAGNETIC RESONATOR
Filed Nov. 9, 1959 8 Sheets-Sheet 2

WESLEY C. MILLER
INVENTOR

BY
ATTORNEY

Aug. 21, 1962 W. C. MILLER 3,050,627
NUCLEAR ELECTROMAGNETIC RESONATOR
Filed Nov. 9, 1959 8 Sheets-Sheet 4

WESLEY C. MILLER
INVENTOR

Aug. 21, 1962 W. C. MILLER 3,050,627
NUCLEAR ELECTROMAGNETIC RESONATOR
Filed Nov. 9, 1959 8 Sheets-Sheet 5

WESLEY C. MILLER
INVENTOR

BY
ATTORNEY

Aug. 21, 1962  W. C. MILLER  3,050,627
NUCLEAR ELECTROMAGNETIC RESONATOR
Filed Nov. 9, 1959  8 Sheets-Sheet 6

WESLEY C. MILLER
INVENTOR

BY 
ATTORNEY

WESLEY C. MILLER
INVENTOR

Aug. 21, 1962  W. C. MILLER  3,050,627
NUCLEAR ELECTROMAGNETIC RESONATOR
Filed Nov. 9, 1959  8 Sheets-Sheet 8

Fig. 21

Wesley C. Miller
INVENTOR
BY
ATTORNEY

United States Patent Office 3,050,627
Patented Aug. 21, 1962

3,050,627
NUCLEAR ELECTROMAGNETIC RESONATOR
Wesley C. Miller, 200 S. Anita Ave., Los Angeles, Calif.
Filed Nov. 9, 1959, Ser. No. 851,847
27 Claims. (Cl. 250—83.3)

This invention relates to a nuclear electromagnetic resonator, and hereinafter this device will be designated as the Resonator which connotes nuclear electromagnetic and radiation measurements. In the various formulae which will be hereinafter quoted the sub exponent used in these formulae to designate the nuclear electronic resonator will be indicated as res.

The Resonator measures electromagnetic energy from the atom, whether in the earth, the atmosphere or outer space, also whether alone in an element or in atomic or molecular combination either as compounds or mixtures. By means of it certain calibrations and indices are obtained which relate to the frequency of the emitted energy, the ionization and resonance potentials, i.e. energy levels, and other factors related to the nuclear magnetic resonance of the atom.

Specifically, having determined such indices or calibrations for a given atom, molecule, or in general a substance, the Resonator makes it possible to determine for a substance:

(1) The presence or absence of the substance nearby, or at any distance.
(2) If present, the distance between the point of measurement and the substance.
(3) The magnitude of the energy emission, i.e. the magnitude of the substance body.

Calibrations or indices corresponding to the various elements and substances at present represent three parameters, namely:

(1) Frequency and related wavelengths in the electromagnetic spectrum.
(2) Ionization and/or resonance potentials, that is energy level relations.
(3) Space charge bias cut-off.

It is to be stressed that the Resonator method receives energy from the atom, element or substance combination and makes the desired measurements of the received energy. The Resonator is not involved with measurement methods which depend upon the reception of reflected energy which has been transmitted from a source to the substance and measured by phase difference, time interval or otherwise, from a reflected signal, such as radar, sonar or similar methods.

The Resonator receives electromagnetic energy directly emitted from the substance source. The electromagnetic energy thus received, detected and measured is alternating in character but appears as superimposed upon a unidirectional component. In other words it is both unidirectional and alternating in character. This does not mean to say that it is rectified, as the full wave characteristic of the alternating current component is fully preserved.

Other objects, advantages and features of invention may appear from the accompanying drawings, the subjoined detailed description and the appended claims.

Referring more particularly to the drawings, the foregoing objects and purposes of my invention are supported by the following physical facts:

(1) If a cylindrical magnet having a coaxial opening is used as part of the Resonator reception apparatus, polarization of the magnet in one direction permits reception; whereas polarization in the opposite direction blocks out all reception.

(2) If an electrostatic field is interposed between the Resonator apparatus and the energy source, again, polarization in none direction permits of energy reception; whereas reversal of polarity blocks out all reception, except for space charge effect.

(3) The use of a resonant cavity in the Resonator apparatus permits of sharply controlled tuning related to the frequency of this incoming energy.

(4) Increased signal strength, that is, effective amplification and, acceleration may be derived through the application of a properly polarized potential applied in the electrostatic field mentioned in (2) above.

(5) Deflection methods applied to the electrostatic field, similar in effect to cathode ray tube operation, permit of electrostatic scanning.

These and other factors will be discussed in more detail later on.

As mentioned above, the calibrations, or indices, presently represent three separate parameters. Others may be possible and will appear as the theory and practice develop.

FREQUENCY

There is reason to believe that the fundamental frequency and wavelength are of the order of the quantum resonance of the electron within the atom or molecule. As such, they relate directly to the wavelength in spectroscopic practice. There are, however, various sub-multiples of these frequencies extending down into the radio frequency portions of the general spectrum and indeed down into spectral regions well below those of radio as such. The present resonator operation utilizes the portion of the general spectrum in the region around $10^{12}$ cycles per second which is in the very far infra-red. This is in the little known portion of the spectrum, below the infra-red and above the micro wave regions.

Mechanically it is practicable to construct resonant cavities which are adjustable in this range where wavelengths are of the order of tenths of millimeters. Generation and direct detection for such frequencies are presently beyond the present state of the electronic art. However, by the use of the lower sub-multiples of this range of frequencies, detection and measurement by orthodox radio and electronic methods becomes feasible.

Figure 1:
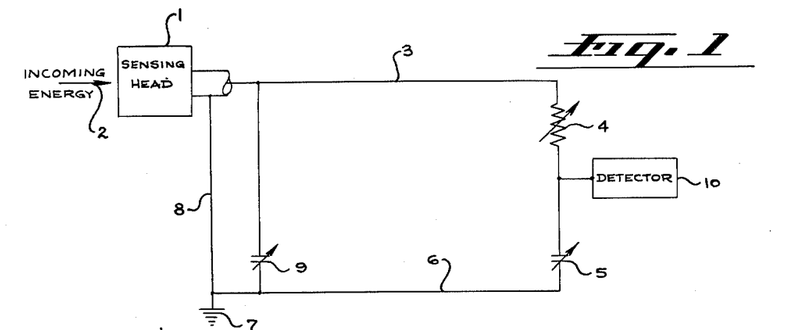
FIGURE 1 is a schematic circuit diagram of my nuclear electromagnetic resonator.
Figure 2:
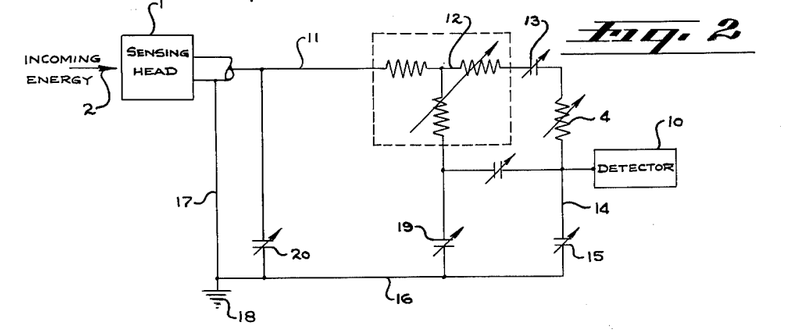
FIGURE 2 is a schematic circuit diagram of my electromagnetic resonator in which identification and magnitude of a substance is determined.

Two very important relationships have already been established in the resonator frequency, resonant cavity, calibrations and tuning in the $10^{12}$ cycles per second range, as follows:

As shown in the simplest form of schematic diagram in FIGURE 1 there is an exponential relationship between the resonator wavelengths and the atomic number Z of the various elements. As shown in FIGURE 2 there is a corresponding relationship between the resonator frequency in this range, frequencies in the X-ray spectra range and the atomic number Z. This is generally indicated by the following formula:

$$\frac{f \text{ res}}{\sqrt{f \text{ X-ray}}} \alpha Z$$

where this symbol $\alpha$ equals proportional to.

The number Z may represent any number of atomic numbers, or the resultant of atomic numbers. The atomic number Z also represents an element or any of the isotopes. Also Z is equal to $A+N$, where N equals the number of excess positive charges on the atomic nucleus. This charge of the nucleus is the essential feature which distinguishes one element from another and determines the position of the element in the periodic table. A equals a constant. Based upon the above recited evidence it appears probable that other relationships will ultimately be established between the resonator calibrations and other fundamental physical data and constants.

In the simplest and most fundamental form of my nuclear electromagnetic resonator a sensing head 1 receives the incoming energy at 2, which is a particular high frequency wave in the $10^{12}$ cycles per second range. The sensing head will be subsequently described in detail. The output from the sensing head 1 passes through the lead 3 and thence into an energy level selector 4, which is a type of variable resistance. The lead 3 then extends to a variable condenser 5 and a lead 6, then extends from the condenser 5 to the ground 7. The lead 8 also extends from the second terminal of the sensing head 1 to the ground 7. A second variable condenser 9 is shunted across the leads 3 and 6. A detector 10 is attached to the lead 3 between the selector 4 and the condenser 5. This detector may be of the tribo-electric type. In FIGURE 2 I have shown a more complex electrical receiving circuit for the incoming energy picked up by the sensing head and consisting of the following, wherein there is shown a relationship between the resonator frequency in the range of $10^{12}$ cycles per second frequencies in the X-ray spectra range and atomic number Z. The formula setting forth this relationship is set forth above. In the schematic diagram FIGURE 2 the sensing head 1 is the same as previously described and receives the incoming energy indicated at 2. One of the outgoing leads 11 extending from the sensing head 1 is connected to an attenuator 12. The wiring arrangement is usual and well known in the art. A condenser 13 is positioned between the attenuator 12 and the energy level selector 4 and is connected to both. A lead 14 extends from the selector 4 to a second condenser 15 and a lead 16 extends from the condenser 15 and thence to the second outlet lead 17 from the sensing head 1. Both of these leads are grounded, as shown at 18. A third condenser 19 is connected between the one outlet lead of the attenuator 12 and the lead 16. A fourth condenser 20 is shunted between the leads 11 and 16.

ENERGY LEVELS

The second calibration parameter relates to ionization and resonance potentials which in turn relate directly to energy levels within the atom. As shown in the several schematic circuits, FIGURES 1 to 3, inclusive, and 11 to 13, inclusive, this calibration is made in terms of a simple resistance, the value of which is directly proportional to the ionization and/or resonance potentials of the element or substance. Where the ionization and resonance potentials are known, the value of this resistance may be predicted, otherwise the calibration is empirical, from which the ionization and resonance potentials may be calculated. The energy level resistance calibration may be made accurate to any desired degree of resistance value.

SPACE CHARGE BIAS CUT-OFF

This is presently a purely empirical calibration and in the present state of development less is known about the basic background which it represents. It is a potential bias between the aforementioned electro-static screen which precedes the sensing head. The value of the energy level bias cut-off is unique to each substance, measurable and adjustable in terms of very small voltage values. See FIGURES 6 and 7.

In its elementary form the Resonator requires the energy level selector calibration only, together with a simple metallic electrode directed toward the target. In this case directional efforts are broad and general, distance and quantitative measurements are possible. Identification is obtained. See FIGURE 1.

Utilizing the magnetic-resonant cavity sensing head, directional effects are greatly enhanced and the received energy is amplified through acceleration of the energy by the combination of the directional magnet and the resonant cavity. Selectivity of identification between substances is greatly improved as in effect the results of the resonant cavity tuning and of the energy selector resonance are superimposed upon each other.

Adding an electrostatic focusing device in front of the above magnetic-resonant cavity sensing head further improves the directional effect and also can be made to further increase the incoming signal strength through the acceleration produced by a high potential electrostatic field.

Again, introducing the space charge bias cut-off calibration, a further increase in selectivity is possible as this again superimposes an additional identification calibration index upon the two previously in themselves superimposed resonance calibrations. This calibration increases the signal response but does not improve the directional effect.

Figure 3:
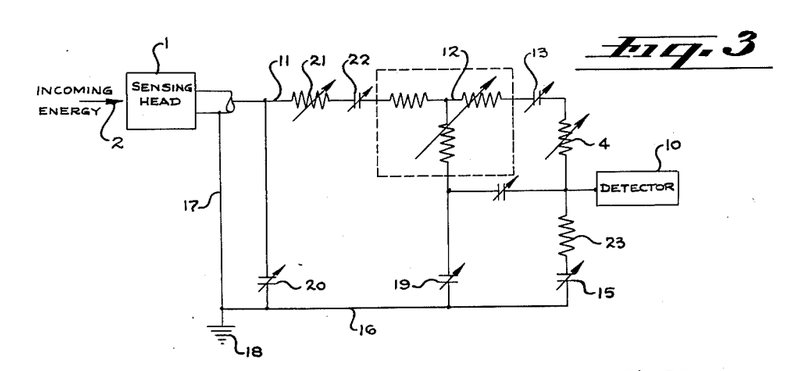
FIGURE 3 is a view similar to FIGURE 2 in which the additional element of distance is added.
Figures 19, 20:
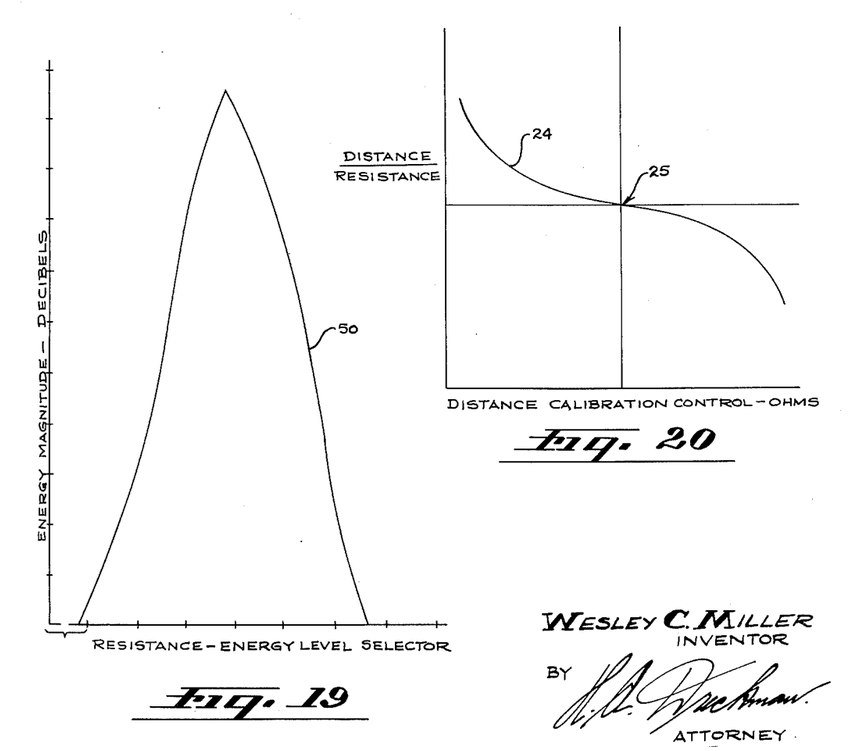
FIGURE 19 is a chart plotting energy level selector resistance against energy magnitude.
FIGURE 20 is a chart plotting distance calibration in ohms against distance measured as resistance.

As shown in FIGURE 3, a distance element consisting of the variable resistance 21 may be introduced in series in the outlet lead 11 of the sensing head 1. Also a variable condenser 22 is inserted between the resistance 21 and the attenuator 12. Also in this arrangement a resistance 23 is inserted ahead of the condenser 15. In all other respects the wiring circuit of FIGURE 3 is the same as that previously described in FIGURE 2. In FIGURE 20 I have illustrated with a curve the relationship of distance calibration control, to adjustment for direct proportion between distance and distance measurement resistance element. The curve is plotted with the distance calibration control in ohms against distance over resistance. In other words, the reading of the resistance 23 to the reading of the variable resistance 21. This curve is indicated at 24 in FIGURE 20. The point 25 is the adjusted operating point for distance measurements, the distance being directly proportional to the distance parameter resistance value.

Figure 22:
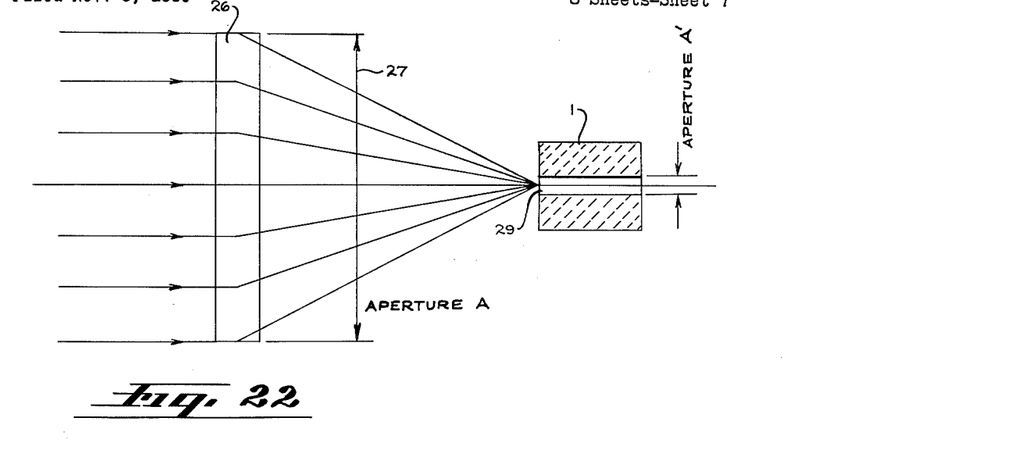
FIGURE 22 is a schematic view illustrating the use of a magnetic or electrostatic lens system in combination with the sensing head.

In this connection it should be noted that considerably increased incoming signal strength may be obtained by either of the following two methods, or by a combination or superimposition of each. That is, a magnetic or an electrostatic lens 26 may be inserted ahead of the present magnetic resonant cavity sensing head 1, such that its effective aperture 27 is considerably greater than that of the head without the lens. See FIG. 22. Basically the resonator is sampling a small cylindrical section of the energy produced by and emitted from the parent source. Hence, if the diameter of the sampled cylinder is increased but is subsequently focused into the magnetic resonant cavity sensing head 1, the magnitude of the received energy from the sample will be increased by the square of the relative apertures of the above mentioned magnetic or electrostatic lens 26 and of the present head aperture 29. For example, if a magnetic lens having an effective 3 inch aperture gathers the sample energy and focuses it into the existing 3/16 inch magnetic sensing head, we have an increase of 256 times in the amount of energy which ultimately reaches the resonant cavity. Within the limits of mechanical magnetic and electrostatic lens construction there is no reasonable limit beyond which this increase in sample size may not extend. This is of particular vaue for long range work with relatively small initial energy emission from the substance to be located and measured.

For the determination of the presence or absence of a particular substance, three basic apparatus elements are required, namely, (1) A sensing head 1 of one form or another to receive the sampled energy from the substance. (2) The energy level selector; and, (3) A means of detection or response to the measured signal 10. These elements are shown schematically in FIGURE 1. The two added variable capacitors or condensers 5 and 9 are a refinement which permit an increase in the sharpness of the response. They require initial adjustment only to improve the circuit operation so that the basic circuit elements may operate more efficiently. The sensing head has been touched upon briefly in the foregoing discussion, but it and its several forms will be described more fully in a following paragraph.

Having prepared the circuit for the determination of presence or absence of a substance, the insertion of an electrical attenuator element 12 as shown in FIGURE 2, permits of a measurement of the relative magnitude of the energy received from the substance, that is, related to quantity or size of the substance body from which energy is being sampled. Again the added variable capacitors 15, 19 and 20, requiring initial adjustment only, are circuit elements which improve the selectivity and response of the full circuit arrangement. The attenuator 12 shown may take any of several forms, depending upon the specific circuit requirements.

The next step is the inclusion of a series adjustable resistor 21 as shown in FIGURE 3 for the measurement of the distance from the point of measurement to the substance source itself. In addition a distance control resistor 23 is inserted as shown in FIGURE 3. With the distance calibration control resistor 23 in proper adjustment (its value is of the order of several megohms) the value of the distance parameter resistance 21 becomes strictly proportional to distance and/or depth from the point of measurement to the source. Again this will be discussed in more detail below.

It will be noted in FIGURES 1, 2 and 3 that a triboelectric detection means is indicated. This is a manual detection which requires full and detailed discussion later on. The word tribo means to rub, and the detection device 10 is one which will detect an electrical potential by rubbing the same with the fingers encased in a cloth glove. Other forms of detection which more nearly fit into the pattern of accepted orthodox practice may be applied to replace the manual tribo-electric method.

The various resistor and capacitor elements shown are standard designs common in the electronic art. They require no special features to make them operable as they are required to operate only in the audio frequency an direct current ranges.

SENSING HEAD

The elementary form of sensing head 1 is a simple metallic electrode which, directed toward a source, receives energy from the source. In this form the energy level selector 4, as shown in FIGURE 1, is the only calibrated element which produces selectivity between substances. Directional effects are broad but selectivity is effective.

Figure 4:
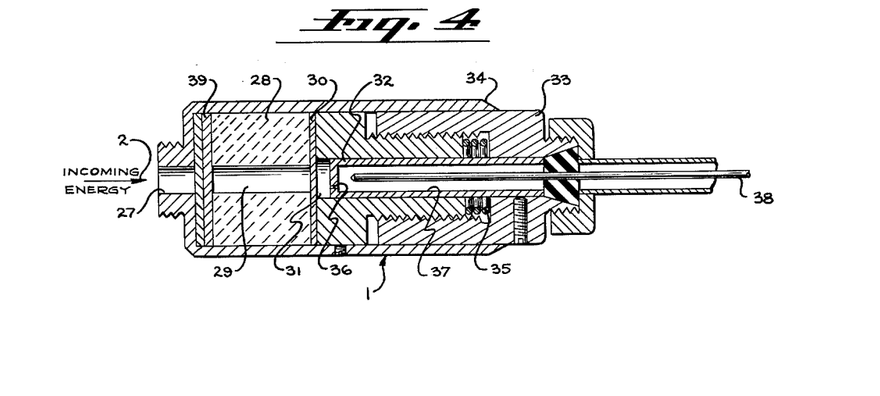
FIGURE 4 is a longitudinal sectional view of the sensing head taken on line 4—4 of FIGURE 5.
Figure 5:
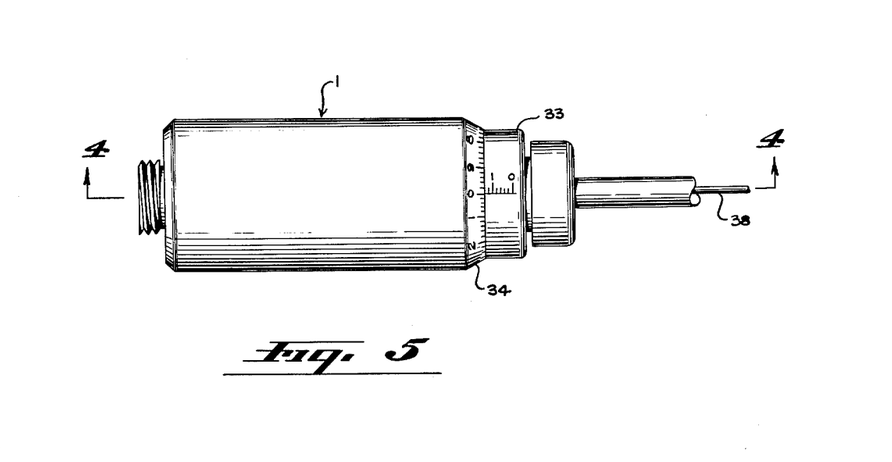
FIGURE 5 is a side elevation of the sensing head.
Figure 15:
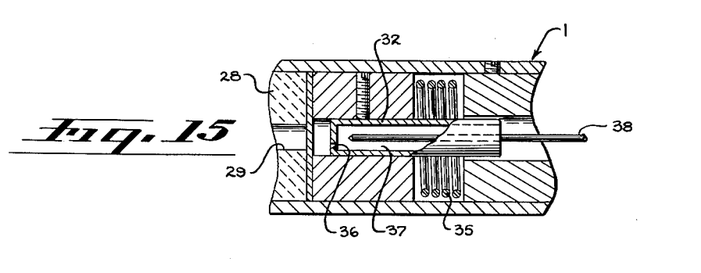
FIGURE 15 is a fragmentary longitudinal sectional view of a precalibrated resonant chamber in the sensing head.

An improved form of sensing head is shown diagrammatically in FIGURES 4 and 5. It consists of: a cylindrical permanent magnet 28 having a coaxial cylindrical opening 29 along its polarized axis. The magnet is unidirectional polarized with respect to the incoming energy. Reverse polarity acts as an effective barrier to the incoming energy and no response is possible under such a reverse polarity condition. A thin non-magnetic diaphragm 30 at the rear end of the magnet. A resonant cavity 31 formed by the above diaphragm and by an adjustable piston 32 as shown. The piston is adjustable by a screw head device 33 with calibrations on the barrel 34 of the adjustable element to give a clear indication of the length of the resonant cavity. A spring 35 is provided to take up backlash in the threads so that the relative length of the resonant cavity is always measured from the same reference point. The length of the resonant cavity is adjusted empirically, or is preset, to accurately agree with the sub-multiple of wavelength of the energy received from the substance source. The screw thread adjustable resonant cavity may of course be replaced by a fixed preadjusted cavity element if desired. This is indicated in FIGURE 15. The face of the plunger 32 has a small non-axial orifice 36 which opens into a hollow space 37 in the rear of the plunger. This is to transmit energy from the resonant cavity into the hollow space 37 which acts as a coaxial transmission line. The location of the orifice is determined by operating resonant cavity theory, found in any physics text. A probe 38 inserted into the coaxial line, the probe in turn being connected to a coaxial cable 3 or 11 which serves as the direct electrical connection between the sensing head and the circuitry indicated in FIGURES 1, 2 and 3. In front of the magnet are two discs 39 of polaroid type material so adjusted that their polar axes are at right angles. This element has been shown empirically to be instrumental in improving directional effects, while it is not ordinarily expected that common polaroid materials should be effective in the frequency ranges involved, nevertheless, its presence as above described effects an improvement in directional operation.

Figure 6:
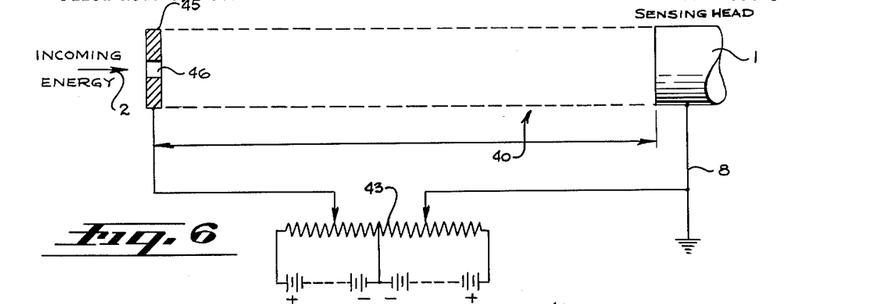
FIGURE 6 is a schematic diagram illustrating the use of an electrostatic shield in combination with the sensing head.
Figure 7:
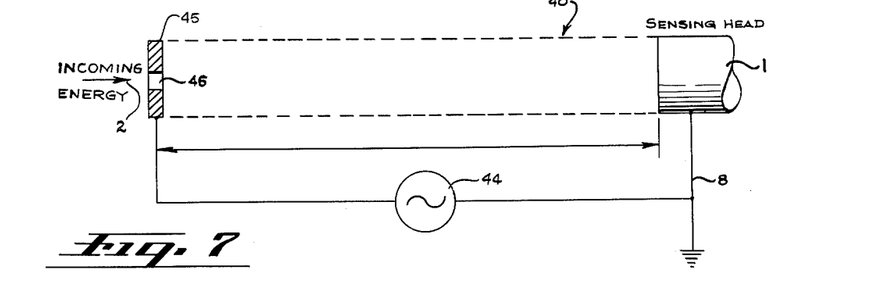
FIGURE 7 is a view similar to FIGURE 6 but illustrating the use of applied A.C. potential between the screen and the sensing head.
Figure 8:
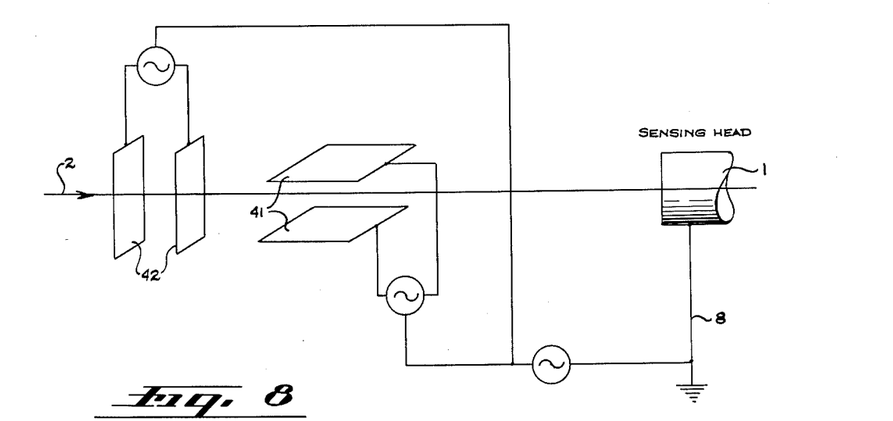
FIGURE 8 is a schematic diagram illustrating the use of deflection plates for horizontal and vertical rectilinear scanning.

As shown in FIGURES 6, 7 and 8, I may mount a nonmetallic insulating tube 40 in front of the polarized discs 39. In front of the tube 40 I may provide metallic plates 41 for vertical deflection and these are potential sources for vertical scanning. Ahead of these plates I may insert plates 42 which are a potential source for horizontal scanning. The plates 42 are horizontal deflection plates while the plates 41 are vertical deflection plates. If these plates are used the space charge bias potential is applied between these plates and the grounded body of the sensing head 1. These elements relate to the refinement of the directional effect and also increase the incoming signal strength and are attached to the sensing head 1 at the front thereof in any suitable manner. The particular sensing head 1, previously described and shown in FIGURES 4 and 5, and the additions thereto as indicated in FIGURES 6, 7 and 8 are obviously but one of many mechanism forms which may be used. In FIGURE 6 the mechanism 43 is an adjustable current and polarity. It is adjustable for directional sensitivity or for space charge effect. As shown in FIGURE 7 I may introduce a frequency source 44 between the static shield 40 and the ground lead 8 of the sensing head 1. This frequency source may be radio or audio frequency to provide chopping potential or radio or audio frequency tuned to a sub-multiple of the base energy source frequency. The wave shape may be a sine wave or it may be otherwise shaped, that is, integrated or differentiated, depending upon its specific use.

In FIGURE 6 I have shown an electrostatic mechanism which improves the directional effect. A plate, or guide 45, at an adjustable distance in front of the above described magnet with an adjustable applied potential between the said plate and the magnet, the plate having a centrally located circular orifice 46 which is accurately aligned with the coaxial opening 29 in the magnet 28. Adjustment of the applied potential with respect to energy levels and adjustment of the linear distance between the plate and the magnet with respect to frequency, afford an improvement in the sharpness of the directional effect.

A further modification in FIGURE 1 provides for the introduction of an alternating potential between the plate 45 and the magnet 28. This provides a chopping action in the incoming energy, the chopping to be at a rate which presents a signal to the receiving circuits which is at a frequency in the radio or, if desired, in the audio portion of the overall electromagnetic spectrum, but which is related to the basic electronic frequency.

A further addition in FIGURE 8 shows the application of two sets of parallel plates 41 and 42 mounted at right-angles to each other but with the center of spacing between each pair of plates accurately symmetrical with respect to the axis of the sensing head magnet 28. This particular assembly and application relates to rectilinear scanning which follows the precepts of scanning such as is used in television and in other applications of similar cathode ray tube technique. In effect, this application permits of receiving of energy from large source bodies, but of utilizing angular components of the said energy. In terms of magnitude, electronic compensation may be introduced to reduce or to eliminate angular distortion effects. The general application of the scanning technique will probably involve reasonably large linear distances. Thus angular distortion will be at a minimum and as such it can be compensated for.

In addition to the suggested forms which are shown, it is possible to insert magnetic or electrostatic focusing lenses and other devices, as mentioned earlier in this discussion, to increase the size of the sample of the received energy and thus to increase the magnitude of the received signal energy.

Utilizing two sets of sensing head equipment with properly spaced axes, together with the necessary modifications to the associated circuitry, stereoscopic reception and/or stereoscopic rectilinear scanning may be provided.

There are many forms and combinations of the energy receiving devices which can be adopted for particular uses, employing the principles of electrostatic and electromagnetic optics, all of which are applicable to the Resonator method and apparatus.

At least four means of detection are possible and practicable. These will be discussed separately below.

(1) Tribo-Electric

We are accustomed to indicators or detectors which employ the use of our senses of sight and sound. We are less accustomed to the use of our sense of touch for such purposes. The tribo-electric effect which relates to the use of friction and electrostatic effects becomes a useful, sensitive and readily applicable detection means in the Resonator operation.

Figures 9, 10, 11:
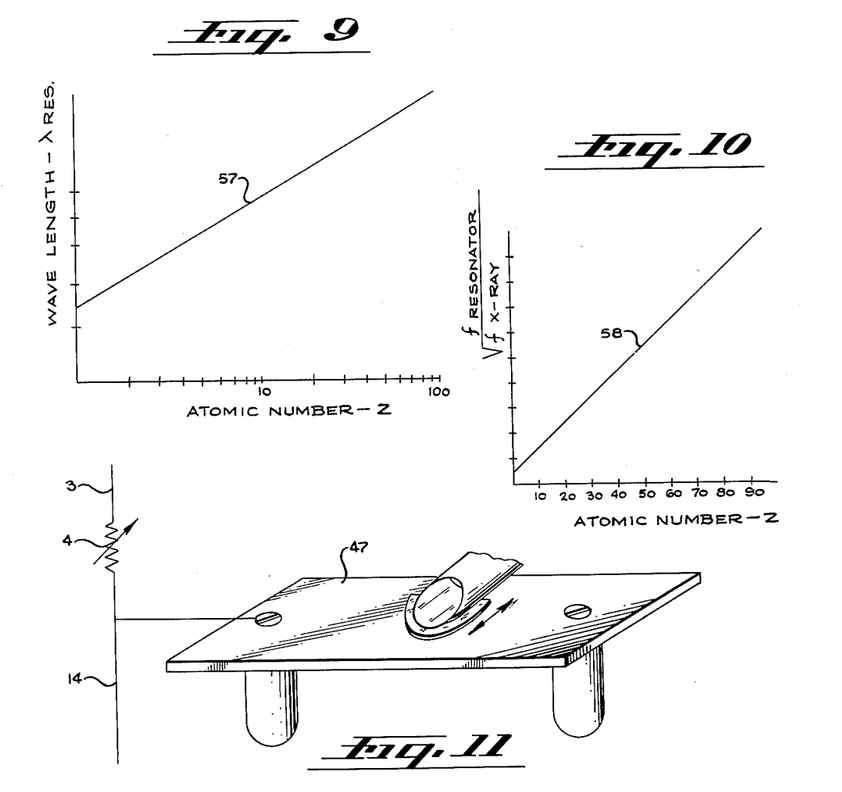
FIGURE 9 is a chart plotting wavelengths against atomic number.
FIGURE 10 is a chart plotting wavelength and spectrum frequencies against atomic number.
FIGURE 11 is a schematic perspective view illustrating the triboelectric detector.

A bar of hard rubber, ebonite or similar material 47, indicated in FIGURE 11, is connected to the Resonator circuit. This bar is rubbed rhythmically with a piece of silk operated by the operator's fingers or hand. In areas of circuit adjustment when aperiodic conditions exist, the coefficient of friction between the rubber and silk is high and substantial resistance to the rubbing is apparent. If the rubbing is continued while the appropriate circuit element is being adjusted, at the point of resonance, i.e. detection, the coefficient of friction is abruptly and substantially reduced. At this point the circuit is in resonance or is attuned to the particular parameter under consideration. In other words the abrupt change in the coefficient of friction indicates detection. This method of detection, while quite uncommon, is extremely delicate and accurate. It is a technique which is readily learned by practice and its use is in no manner related to any particular person or type of personnel, which is to say that any person can learn the technique and operation.

It should be emphasized that all quantitative measurements of length, presence, magnitude and of other parameters measured by the Resonator do not in any manner relate to the magnitude of this tribo-electric effect. All such measurements are in terms of the calibrated adjustable elements included within the Resonator apparatus. (See FIGURES 1, 2 and 3.) The detection as described is a simple "yes or no" null type of detection; the measurements relate to the adjustable circuit and apparatus elements.

This means of detection offers a simple and effective operating technique which is extremely valuable where otherwise complex detection equipment would be required. A related feature of the tribo-electric detection is that a slight noise results from the rubbing while the circuit elements are under adjustment. This noise ceases abruptly at the instant of detection, that is when the coefficient of friction suddenly drops. While the noise is incidental to the actual detection, nevertheless it is also an indication to any associate of the operator that detection has occurred.

Every measurement possible with the resonator may be made by this detection technique. For example, resonant cavity tuning, energy level selector adjustment, distance, presence or absence, direction, attenuation or magnitude; each of these is detected in the same manner. Also initial determination of the empirical calibration parameters is made in the same manner.

(2) Chopping

In view of the uni-directional characteristic of the incoming energy a chopping technique may be employed as a means of producing a detection signal which will indicate visually or by sound.

If in the sensing head construction the previously described electrostatic shield FIGURES 6, 7 and 8 is employed in front of the magnet assembly, and if a properly shaped, alternating potential is applied between the shield and the grounded magnet assembly, the energy received at the point of detection will be chopped at the frequency of this applied potential. The chopping frequency may be of the order of either radio or audio frequency, depending upon the desired results in detection. The shaping of the chopping potential may vary from a simple sine wave source to shaped square wave pulses, also depending upon the techniques adopted and desired. Moreover there is advantage to be derived by adjustment of the chopping frequency to be attuned to the particular frequency envelope which is to be measured, which in turn depends upon the substance under measurement.

(3) Envelope Technique

As previously indicated, for each basic frequency and/or wavelength in the range of the nuclear resonance of the atom, there exists a series of sub-multiple frequency envelopes extending all the way down through the entire spectrum—virtually to the point of zero frequency. These sub-multiple envelopes bear specific relationships to each other, dependent upon the character, and value of the initial nuclear magnetic resonance frequency of the quantum radiation from the specific substance under consideration. One characteristic series of submultiple elements is shown schematically in FIGURE 21, and shows a wave plotted as decibels-energy magnitude, against resonant cavity length and is shown at 48.

Figure 12:
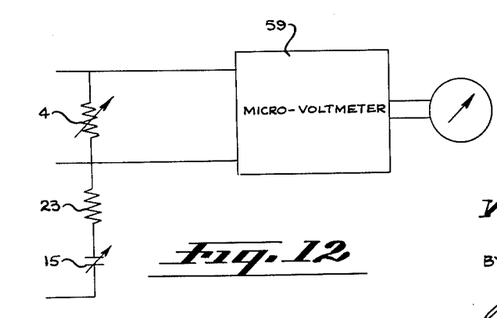
FIGURE 12 is a schematic diagram illustrating the use of a potential detector.
Figure 13:
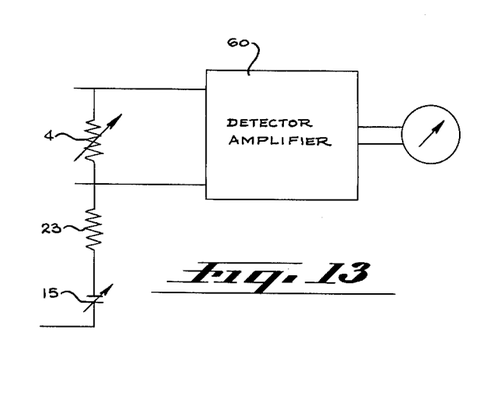
FIGURE 13 is a view similar to FIGURE 12 but showing a radio or audio frequency detector.

From these phenomena a further detection means becomes possible, see FIGURES 12 and 13, using orthodox radio or audio frequency apparatus and techniques.

In principle, a radio or audio detection and amplification circuit bridged across an appropriate element under consideration will give a measurable signal which can be used for application to accept forms of measuring or recording apparatus. A suggested application of this method is to bridge a high impedance detection circuit across the energy level selector. Other points of connection offer advantages for particular requirements.

(4) Balancing Potential

An additional detection method consists of the application of an adjustable electrostatic potential across the equivalent of the previously described hard rubber bar 47, such that this balancing potential, when adjusted, exactly equals the potential produced on the bar by the energy from the incoming signal. In this form of detection application care must be exercised to provide complete electrostatic shielding for the apparatus and the bar.

These detection methods may be used separately or in combination dependent upon the specific uses to which the resonator method and apparatus may be put.

The resonator deals with energy which results from the intricate interactions within the atom or it could not operate. Atomic and molecular boundary conditions will probably furnish the ultimate theoretical proof of the operation. In effect every element and its isotopes must have an effect upon every other substance, whether in or on the earth or in outer space. These interactions may presently be of too small a magnitude for measurement by means within the scope of the present arts but they nevertheless exist.

The present hypothesis for the resonator operation presents a picture of the earth's magnetic field as the medium which transmits this energy throughout the earth and into that part of the space which is permeated by the earth's magnetic field. Correlatively, similar fields in space present an expanded view of that which happens in our own earth. There are actually two universally permeable forces which effect us within the earth and in space—the magnetic fields and gravity. While gravity may be ultimately shown to be interconnected with the resonator operation, the present indication is that the magnetic field is the all-pervading influence which permits the resonator to operate. As a matter of fact it may ultimately be shown that the magnetic field of the earth itself is a resultant of the myriads of interconnected electromagentic emissions and radiations from the elements and their isotopes of which the earth is made up.

We all know from the theoretical and practical advances of the past, that matter and energy are clearly related, presumably by the famous Einstein relationship $E=Mc^2$. Matter, as we normally think of it, is not transparent. Introducing the concept of the overall magnetic field, the matter-energy relationship indeed becomes transparent, whether in the form of the solid earth beneath us, of the atmosphere in which we live, or of the realms of outer space.

It is the present resonator concept that the individual atomic and molecular energy emission modulates and indeed forms the major overall magnetic field. In effect this means that each element or substance modulates the overall field, and the latter acts as a carrier which transmits the individual energy components for indefinite distances through all pervading matter. There is at least a probability that this effect transmission is accomplished through and between the atomic and molecular boundaries and domains.

To cite specific examples of the resonator operation, a very considerable amount of exploratory and experimental work has been done in connection with sub-surface mineral location at great depths within the earth.

Having established calibration indices on samples in the laboratory, it is readily possible to detect the presence or absence of identical substances, their depth from the surface and their relative magnitude at great depths. Where present techniques permit of comparison of such resonator identification at depth, the correlation between the resonator findings and actual physical measurements is extremely accurate. These are not measurements from signals transmitted into the earth, they are measurements of energy received directly from the substance in question.

There are definite limits beyond which transmitted energy from the surface may not be made to penetrate into the earth or through other substances. The resonator recognizes no similar limits. Indeed, the only effective shielding device thus far known to the resonator is an opposing magnetic field, which does eliminate the reception of energy from a substance behind the shielding magnet. This in itself pretty well establishes the magnetic carrier nature of the received energy. In turn if magnetic energy is present, a corresponding electric field is present and the two fields are inextricably combined in all nature.

The frequencies involved are those of the quantum structure of the atom. It is fortunate for practical purposes that these basic quanta frequencies produce in turn a series of submultiple envelope frequencies which extend throughout the entire spectrum, and which can be measured not only by the resonator technique but also form the basis for spectroscopic, radio and power techniques.

Figure 18:
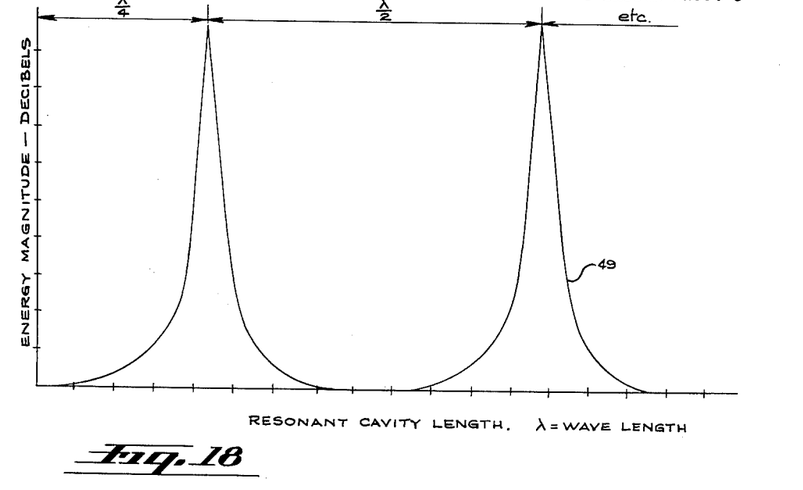
FIGURE 18 is a chart plotting the energy magnitude of the resonator against resonant cavity length.
Figure 21:
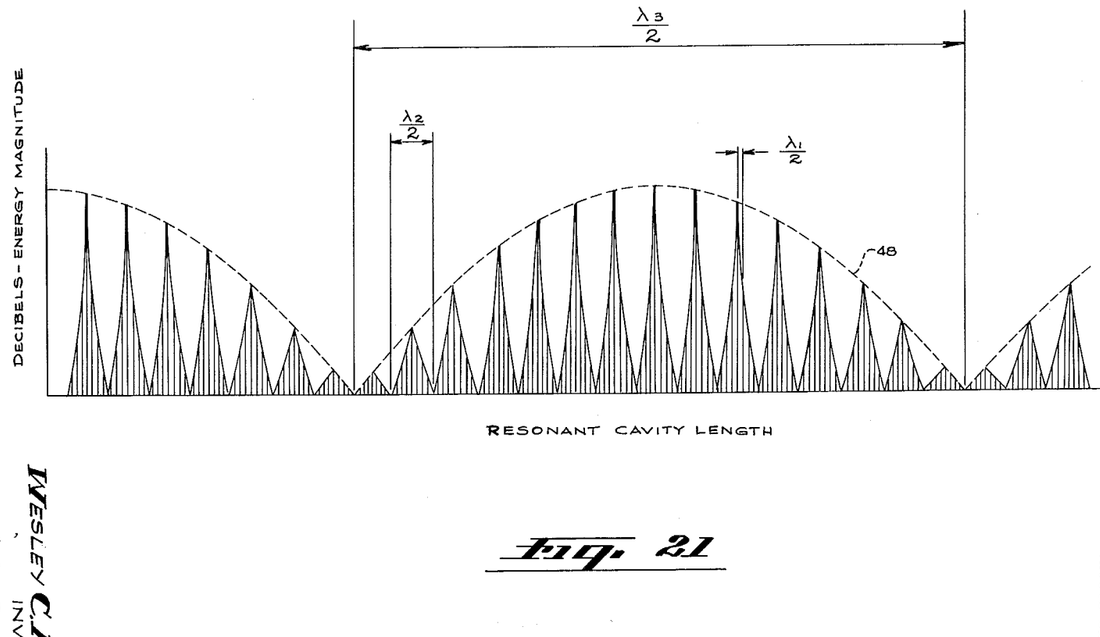
FIGURE 21 is a chart plotting the resonant cavity length against energy magnitude in decibels.

One indicative set of resonant relationships in the operating range of frequencies of the order of $10^{12}$ cycles per second is shown in FIGURES 18 and 19. The curve 49 represents the tuned frequency response of the resonant cavity 31 and the resonant cavity length is plotted against the energy magnitude in decibels. The curve 50, shown in FIGURE 19, plots the resistance of the energy level selector against energy magnitude in decibels. These represent the actual tuned frequency response of the resonant cavity 31 within the sensing head 1, and of the energy level selector. The frequencies and wavelengths are in themselves sub-multiples of the basic quantum frequencies. In addition a typical envelope series is shown in FIGURE 21, where a specific schematic relationship is shown between the frequency and wavelength of the cavity resonance and two of the typical envelopes. Still lower frequency envelopes exist or, in other words, there is a whole series of interrelated sub-multiple envelopes, the entire series directly related to and proportioned to the basic quantum frequency and wavelength to each substance under consideration.

A very important facet of the resonator and theory relates to that which may be termed "age memory." This has been established on an empirical basis and the existing records of experimental work completely bear out the theory that such age memory can exist.

Throughout geologic time influences have been impressed upon geologic formations to the extent that a resonator calibration may be determined which classifies the age of the formation. This has been established in the laboratory and has been repeatedly correlated with geological stratigraphic analyses derived by other presently accepted means. Age calibrations have been established for many of the geological periods and epochs as they are commonly separated, such that with the resonator it becomes quite practicable to determine from the earth's surface, the relative present positions and the geologic history of earth movements, unconformities, thickness of strata and other related information. The importance of this type of measurement can be readily understood.

In view of the apparently unlimited distances over which the resonator can operate, regardless of intervening matter, and also in view of the straight line relationship between the source and the point of the resonator measurement, it is also apparent that the resonator has many uses in the detection at a distance of various objects, and substances. There is the possibility that curvature of the major magnetic field, magnetic variation and magnetic declination can have distorting effects, particularly as directions on and in the earth's approach to the horizontal. However, there may be offsetting corrections made for them by correcting for the disturbing influences, or in the extreme case by correlative triangulation.

Briefly, these resonator applications could have important implications in the field of surveying and in identification and location techniques for our armed forces.

IN OPERATION

For the present purposes operation will be discussed in terms of the basic circuit and apparatus. By extrapolation it will be readily seen in principle, how these simplified operations may be extended to more complex functions of the equipment when it is used for extended and specialized requirements.

The use of the tribo-electric detection or indication necessitates a specific measurement for each individual parameter. Once an index measurement is found for some specific parameter, a similar measurement is made for the next desired parameter. In effect the final group of measurements for a particular purpose consists of a superimposition of each and all of the prior measurements. In general the completion of a measurement, that is the finding of a condition of detection or indication, relates to the equivalent of a resonant condition. This is done by a step-by-step method until the point of resonance is found. Other parts of the circuit and apparatus not in use during the determination of the resonant point for a given parameter are in effect non-functional while an individual group of circuit elements is being adjusted. Using indication or detection means which do not employ the tribo-electric effect will make possible the simultaneous and continuous indication of all parameters, but for the moment the description in terms of the individual measurements is deemed to be the simpler method of exposition.

As previously noted detection, that is an "indication," is found when the coefficient of friction between the operator's silk-encased fingers and the hard rubber bar suddenly reduces from a high value to a very much lower one. This indication is very sharp and clear and can be described as a sharp null.

Figure 14:
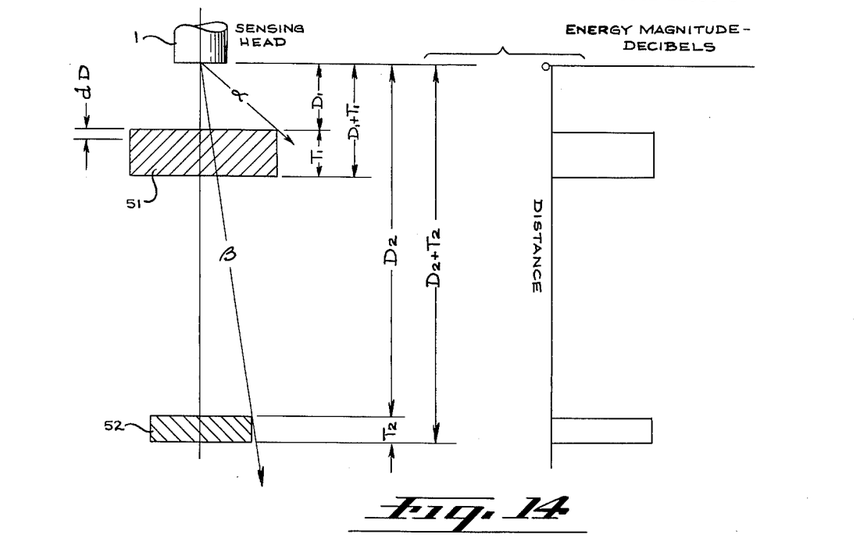
FIGURE 14 is a schematic view illustrating the measurement of distance and energy of my resonator through intervening bodies.

For the purpose of illustration of operation, assume a set of conditions such as is shown in FIGURE 14. The bodies 51 and 52 of identical and uniform composition are shown, spaced at distances $D_1$ and $D_2$ from the resonator sensing head 1. Each has thickness $T_1$ and $T_2$. Calibration has previously been determined for the substance of which the bodies are composed. It is desired to know where they are, how far away they are, how thick they are and the uniformity of composition throughout their thickness.

(1) The sensing head 1, the energy level selector 4 and any other calibrating parameters used are preset for the already determined respective index calibrations. That is, the resonator equipment is, in these respects resonant to the incoming energy from the substance represented in the two bodies.

(2) The sensing head equipment is axially aligned to be directed at the bodies.

(3) The distance measuring resonator element 21 is adjusted by increments until a null indication is felt, which would correspond to $D_1$.

(4) Continuing with the incremental adjustment of the resonator distance element 21, another null is found corresponding to the distance $D_1+T_1$. In other words, the measurement determines the distance to the near and then to the far side of the body 51.

(5) Continuing in the same manner the distance to the near and to the far side of body 52 is determined.

(6) Throughout the above measurements the attenuator 12 is set at zero or at some arbitrary setting which can often be anticipated to be away from the magnitude resonance value.

(7) Now set distance in the resonator apparatus for a distance $D_1$ and adjust the attenuator 12 by incremental steps until a null indication is obtained. The value thus determined is the relative magnitude of the substance value at its near side.

(8) Now add a small increment of distance $dD_1$ and again measure magnitude at this distance $D_1+dD_1$. This is the relative magnitude at such a distance. Continue such measurements until finally at distance $D_1+T_1$ a zero value of magnitude will be measured at the far edge of the body 51.

(9) Continue the same process for body 52.

(10) On a laboratory bench, axial alignment of the resonator head 1, and the bodies under test, may of course be a simple physical alignment. If, however, the tests are made when the bodies are not visible, for example, if they are within the earth, a scanning technique is used, as further indicated in FIGURE 14. For example, the resonator sensing head 1 may be adjusted angularly until a null response is obtained at the lateral boundaries of each body. Another method is to move the resonator sensing head parallel to the axes of the bodies under test, or to move the bodies themselves in a direction parallel to the sensing head axis. A null indication is found when the resonator sensing head comes into exact alignment with the physical boundary edge of the test object.

The resonator receives energy from the specific object or substance under test. Its measurements are in no way hindered by whatever substance then may be intervening between the sensing head and the test object. Moreover any number of test objects of identical composition may be aligned with each other, in which case the resonator can be made to measure the attributes of each object in turn. An example of this lies in a commonly used application of the resonator in measuring mineral or petroleum hydrocarbon deposits within the earth. Numerous succeeding strata may lie one above the other. The resonator can select each stratum in turn, measure its depth, thickess, relative internal magnitude and locate its lateral limits. See FIGURE 16. In this figure there is shown schematically gas, oil and water strata, 53, 54 and 55. The resonator apparatus is located at 56 and can sweep a considerable horizontal area.

CALIBRATION

If a true sample of a substance to be tested is available it is convenient to calibrate it in the laboratory by setting it up very close to, or in contact with, the resonator sensing head. Calibration is carried out in successive steps as follows:

(1) With all circuit elements set at zero adjust the sensing head 1 until a null indication is found, starting at zero for the cavity length 31 on the sensing head. In the frequency ranges for which the present head is designed, the first calibration is that corresponding to a one-quarter wavelength in the range of approximately $10^{12}$ cycles per second. Further calibrations will be found, each one a half wavelength apart, the entire range being available down through the radio frequency range and including the sub-multiple frequency envelopes already discussed. The sub-multiple frequencies also group themselves with respect to the one-quarter and one-half wavelength relationship. The particular head calibration chosen for use depends upon the requirements at hand.

(2) With the sensing head calibrated, next adjust the energy level selector 4 until a null indication is found. This is the energy level selector calibration and is proportional to one of the ionization potentials of the test substance. It should be noted that many or most substances have more than one ionization potential, with the final and greatest at the point of resonance potential, i.e. the highest possible energy level. Thus, several energy selector calibrations may be found, any or each of which is an attribute of the test substance.

(3) With the sensing head 1 and energy level selector 4 calibration determined and set at the proper points in the resonator apparatus, the further calibrations of the space charge bias effect is determined, again by the null detection point.

Thus, when these parameters are determined and the resonator apparatus set for them, the apparatus is then prepared to measure only energy from that particular substance. Further measurements are made as discussed under Operation.

It has been pointed out that the magnetic field is the basic carrier of energy. It follows that the only true shielding which can be obtained must be magnetic in character. If, for example, within the laboratory a sample is set up for calibration, the sensing head 1 can pick up energy from everything in line with its axis. The proximity of the sample to the head makes the magnitude of its energy pick-up greater than that which would be received from other things at a distance. Nevertheless there is the possibility of false calibration unless the sample is shielded from all remote possible disturbances from non-related substances.

For such shielding a convenient means is the use of a shielding permanent magnet with its polarity reversed to that of the magnet in the sensing head. The sample is aligned between the reversed polarity magnet and the sensing head. In this manner all background is effectively eliminated and the calibration obtained can be assured to be that which relates to the test substance.

There are many times, for example, within the earth's body, where a calibration is desired but where specific samples for a substance are not available. For such purposes the following procedure is effective:

(1) Set the resonator apparatus for the depth at which it is desired to establish calibration.

(2) Proceed to calibrate the sensing head, the energy level selector and the space charge bias as described above.

This procedure will give calibrations but will not necessarily determine what the substance consists of. It may be possible at a later time to establish the nature of the substance by comparison with surface samples and their calibration indices.

Everything in nature is emitting and radiating energy of the electromagnetic character which the resonator is sampling and measuring. By establishing resonant measuring conditions the resonator permits us to select and to concentrate upon a particular substance. The entire remaining energy constitutes noise. A familiar analogy may be readily cited in the case of the multitude of radio information and energy which is constantly filling all space. When we learn to adjust appropriate receiving equipment in resonance with some particular wavelength in this highly filled radio frequency spectrum, we receive a selective signal which we recognize and which is of use to us as information for measurement or communication. The remainder of the energy to which we are not attuned is in effect noise. The applications of light are a similar analogy.

It happens that the resonator is working throughout the spectrum in this realm of energy produced by atomic molecular and nuclear emission—energy derived from these sources surrounds us all and is an inherent part of us. The resonator has found a means of selecting, locating, measuring and otherwise making use of this energy. Hence, the specific resonant calibrations and measurements which have been described, in addition to other parameters, are within the scope of an expanded resonator as the state of its art progresses. The resonator permits the resonant separation of each substance from the great background of such noise produced by the infinite number of sources which are working with each other all the time and since time began.

RESONATOR USES AND APPLICATIONS

In the foregoing discussion the basic uses of the resonator; for example, identification, axial location, distance and magnitude have been broadly described. Extension of these uses are outlined below. Manifestly the list is not fully complete as further uses will evolve as the state of the resonator art improves and as it becomes more broadly used. These will be extensions in detail, simple or complex, based upon the fundamental attributes of the resonator methods and apparatus in the measurements of atomic, molecular and nuclear phenomena.

(1) *Identification.*—Presence or absence, in general irrespective of distance within the earth or in space.

(2) *Directional Location.*—Again regardless of space or distance.

(3) *Magnitude—Absolute and relative.*—Absolute energy magnitudes may be established. In other instances relative energy magnitudes will be of practical value.

(4) *Qualitative and Quantitative Analysis.*—To supplement and in many instances supplant chemical and physical methods for analysis.

(5) *Point-to-Point Measurement.*—In each such application point-to-point measurement within the earth and within outer space leads to both short or long distance location of stationary or moving objects or bodies.

(6) *Scanning.*—This can include all techniques from simple plane angular scanning from a fixed or movable point, rectilinear scanning of solid angles, together with the possibilities of three dimensional scanning for distance, magnitude and identification. Scanning from fixed stations on the earth or from stationary or moving stations on air or sea borne platforms are equally practicable.

(7) Specifically, observations of deposits within the earth, geologic and stratigraphic analysis are practicable, as are observations of bodies and phenomena in the atmosphere or in astronomical space.

(8) *Spectral Analysis.*—In view of the physical relationship which the resonator measurements bear to present spectral analysis they can have value in further extending the field of spectral analysis throughout the entire spectrum.

(9) *Resonance, Ionization and Resonance Potential.*—Since these elements are basic to the resonator measurements, the latter can be used to enlarge our present knowledge of these attributes of nuclear, atomic and molecular conditions.

(10) *Analyses of Internal Nuclear Effects.*—Again, as the phenomena within the nucleus are fundamental to the resonator, the field of exploration and analysis of nuclear effects can be extended by the resonator. This may be a potential combination of empirical study leading to the latter hypotheses by which the fundamental nature of our universe may be predicted.

(11) *Computer Applications.*—Inasmuch as nuclear, atomic and molecular phenomena are basic building blocks, a more complete knowledge of them, developed by the resonator approach, can open up an expanded field of improved computer techniques.

(12) *Medical and Biological Applications.*—Cell and tissue study can be approached by the resonator technique. Basic data on their composition and action, differentiation between healthy and diseased cells and tissue can lead to improved knowledge of life itself and specifically to the diagnosis of man's diseases and to suggestions for their cure.

(13) *Military Uses.*—This is a field where the resonator can find immediate application. The near and long distance identification, detection and location of objects in space opens a great vista of observation technique. Airplanes, missiles, submarine and surface vessels and objects can be detected, located, analyzed, their distance and position spotted—all on a continuous scanning and identification program. Corollary to these uses are those represented in the constant observation of commercial and private aircraft, together with the uses associated with guiding beacons and aircraft navigation and landing technique.

(14) *Fish Schools.*—One application which has been considered is that pertaining to the location of schools of fish within the seas. This could give considerable aid to the economics of fishing industry.

(15) *Surveying.*—Because of the directional and distance measuring resonator technique its use should become possible to simplify and assist in the technique of land and geodetic surveying, particularly over rough terrain and over long distances, regardless of present line of sight limitations.

(16) *Altitude and Depth Finding.*—The resonator technique is admirably suited to the uses of altimetry and fathometry. As an altimeter the resonator can be used to detect the distance from an airborne station to the earth by using one of the common elements in the earth's crust, such as silicon, aluminum or magnesium. As a depth finding technique the measurement would quite simply be one of finding the thickness of a water layer. An extension is the measurement of the thickness of ice bodies.

(17) *Astronomical.*—Because of the lack of restriction on distance, the resonator can be a valuable addition to existing optical and radio technique in the study of astronomical space and objects.

(18) *Isotopes.*—The relationship between the resonator response and the atomic numbers of the elements in the periodic system has been established. Similar relationships will be found between the resonator data and the isotope series.

(19) *Lattice Structure.*—The resonator should offer an added tool for the analysis and examination of crystal lattice structure, magnetic domains and the boundary conditions between the atom, molecule and potentially within the atom itself.

(20) *Stereoscopic Use.*—Stereoscopic, three dimensional observation and analysis, together with polarization effects, should be greatly enlarged in scope by the resonator technique.

The resonator invention, because it detects and analyzes the energy field surrounding it, makes possible the identification of rock samples through establishing an energy response from the atomic and isotope assemblage present in the sample. If then, a series of samples of the earth's crust identified by the other branches of geology, as pertaining to any established unit of geologic time independent of geographic distribution but common to all the samples, is found to respond to a common calibration value on the resonator device, this calibration is one found to refer to age memory of the rock formation. Invariably it has been found that this calibration, when used on unknowns, unequivocally establishes the age memory of the unknown, regardless of the lithologic appearance.

The resonator device not only gives a calibration which provides an age identification, it gives detection at the boundary of one atomic and isotopic assemblage as distinct from another, which is intimately contiguous to it. It is, therefore, possible to determine the age of the individual component fragments of a clastic rock by independent index detection on the components; and yet the entire assemblage of all the components responds to the age index of the formation and not to the age index for the individual components.

The resonator device in addition gives depth perception. This makes it possible to use the device as an accurate geologic surface and subsurface mapping instrument which will give depth or distance of focusing head to target boundary. Response to the resonator index will occur at the top of a specific age or composition formation, whether gas, liquid, or solid, and then again at its far boundary. With three or more distance points on near and far boundaries, the attitudes of the formation and its contained liquid are established. With a sufficient number of points a three-dimensional map can be made of the earth's crust, at the same time placing the formation age and/or gas, liquid, or solid composition boundaries in their present or actual relationship, one to the other. The resulting three-dimensional map gives the complete sedimentary and tectonic history of the particular segment of the earth's crust to the specific depth mapped. Theoretical depth or distance perception of the resonator detection device is at least equal to the diameter of the earth and the outmost boundary of its magnetic field, and to the magnetic field of outer space.

Figures 16, 17:
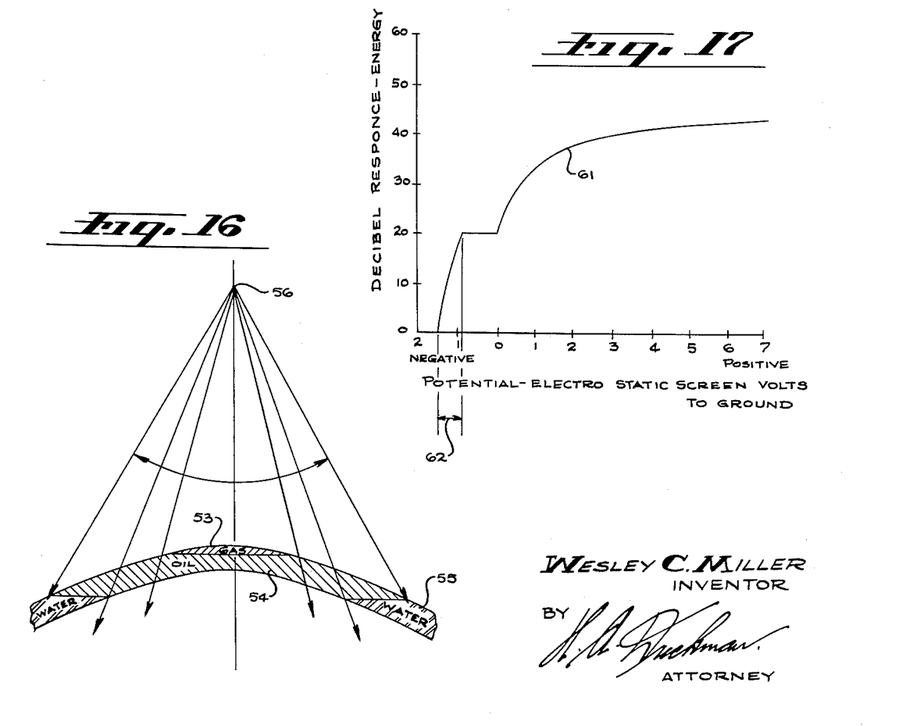
FIGURE 16 is a diagrammatic view illustrating three dimensional rectilinear scanning to a sub surface structure.
FIGURE 17 is a chart plotting the effect of space charge and the use of accelerating potential.

In FIGURE 9, the resonator wavelength 57 is plotted against the atomic number Z. Also in FIGURE 10 the resonator and x-ray spectrum frequencies are plotted against the atomic number Z as shown by the curve 58. In FIGURE 12 I have shown a radio or audio frequency detection means 59 which may be used in place of the tribo-detector 47. In this instance the detection instrument is a microvolt meter. In FIGURE 13 a detector amplified 60 is shown as being useable in place of either the tribo-detector 47 of the microvolt meter 59. In FIGURE 17 the curve 61 shows the effect of the space charge parameter and of the use of an accelerating potential. The particular curve is data taken from a typical oil sample. The distance 62 represents the negative space charge as a function of the test substance. This space charge, therefore, is a calibration parameter.

Having described my invention, I claim:

1. A nuclear electromagnetic resonator to detect the electromagnetic energy of the atom in wave frequency form comprising a metallic electrode, an electronic circuit formed of wire leads including a detector means electrically connected to said electronic circuit to detect the wave emitted from the resonator, a variable energy selector means electrically connected to said electronic circuit to select a wave emitted from the resonator, said metallic electrode being electrically connected to said electronic circuit to feed said wave frequency into the electronic circuit.

2. A nuclear electromagnetic resonator to detect the electromagnetic energy of the atom in wave frequency form in the $10^{12}$ c.p.s. band comprising a metallic electrode, an electronic circuit formed of wire leads including a detector means electrically connected to said electronic circuit to detect the wave emitted from the resonator, a variable energy selector means electrically connected to said electronic circuit to select a wave emitted from the resonator, said metallic electrode being electrically connected to said electronic circuit to feed said wave frequency into the electronic circuit.

3. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit.

4. A nuclear electromagnetic resonator to detect the electromagnetic energy of the atom in wave frequency form comprising a sensing head including a metallic electrode, an electronic circuit formed of wire leads including a tribo-electric detector connected to said electronic circuit to detect the wave emitted from the resonator, a variable energy selector means comprising a variable resistance electrically connected in said electronic circuit to select a wave emitted from the resonator, said sensing head and its metallic electrode being electrically connected to said electronic circuit to feed said wave frequency into the electronic circuit.

5. A nuclear electromagnetic resonator to detect the electromagnetic energy of the atom in wave frequency form in the $10^{12}$ c.p.s. band comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, said sensing head being electrically connected to said electronic circuit to feed said wave frequency into the electronic circuit.

6. A nuclear electromagnetic resonator to detect the electromagnetic energy of the atom in wave frequency form comprising a sensing head, said sensing head having an electromagentic resonant cavity therein, an electrostatic focusing means positioned in front of said sensing head through which the wave frequency first passes before entering the sensing head, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit.

7. A nuclear electromagnetic resonator to detect the electromagnetic energy of the atom in wave frequency form in the $10^{12}$ c.p.s. band comprising a sensing head, said sensing head having an electromagnetic resonant cavity therein, an electrostatic focusing means positioned in front of said sensing head through which the wave frequency first passes before entering the sensing head, an electronic circuit formed of wire leads including a detector means electrically connected to said electronic circuit to detect the wave emitted from the resonator, a variable energy selector means electrically connected to said electronic circuit to select a wave emitted from the resonator, said sensing head being electrically connected to said electronic circuit to feed said wave frequency into the electronic circuit.

8. A nuclear electromagnetic resonator to detect the electromagnetic energy of the atom in wave frequency form comprising a sensing head, said sensing head having an electromagnetic resonant cavity therein, a space charge bias cut-off means arranged forwardly of said sensing head and receiving the incoming wave frequency prior to the sensing head, an electronic circuit formed of wire leads including a detector means electrically connected to said electronic circuit to detect the wave emitted from the resonator, a variable energy selector means electrically connected to said electronic circuit to select a wave emitted from the resonator, said sensing head being electrically connected to said electronic circuit to feed said wave frequency into the electronic circuit.

9. A nuclear electromagnetic resonator to detect the electromagnetic energy of the atom in wave frequency form in the $10^{12}$ c.p.s. band comprising a sensing head, said sensing head having an electromagnetic resonant cavity therein, a space charge bias cutoff means arranged in front of said sensing head and receiving the incoming wave frequency prior to the sensing head, an electronic circuit formed of wire leads including a detector means electrically connected to said electronic circuit to detect the wave emitted from the resonator, a variable energy selector means electrically connected to said electronic circuit to select a wave emitted from the resonator, said sensing head being electrically connected to said electronic circuit to feed said wave frequency into the electronic circuit.

10. A nuclear electromagnetic resonator to detect the electromagnetic energy of the atom in wave frequency form comprising a metallic electrode, an electronic circuit formed of wire leads including a detector means electrically connected to said electronic circuit to detect the wave emitted from the resonator, a variable energy selector means electrically connected to said electronic circuit to select a wave emitted from the resonator, said metallic electrode being electrically connected to said electronic circuit to feed said wave frequency into the electronic circuit, and an attenuator means electrically connected to said electronic circuit, said attenuator being positioned between the metallic electrode and said variable energy selector means.

11. A nuclear electromagnetic resonator to detect the electromagnetic energy of the atom in wave frequency form in the $10^{12}$ c.p.s. band comprising a metallic electrode, an electronic circuit formed of wire leads including a detector means electrically connected to said electronic circuit to detect the wave emitted from the resonator, a variable energy selector means electrically connected to said electronic circuit to select a wave emitted from the resonator, said metallic electrode being electrically connected to said electronic circuit to feed said wave frequency into the electronic circuit, and an attenuator means electrically connected to said electronic circuit, said attenuator being positioned between the metallic electrode and said variable energy selector means.

12. A nuclear electromagnetic resonator to detect the electromagnetic energy of the atom in wave frequency form comprising a sensing head, said sensing head having an electromagnetic resonant cavity therein, a permanent magnet in the sensing head positioned forwardly of said resonant cavity, said permanent magnet having a coaxial opening extending therethrough along its polarized axis, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit.

13. A nuclear electromagnetic resonator to detect the electromagnetic energy of the atom in wave frequency form comprising a sensing head, said sensing head having an electromagnetic resonant cavity therein, a permanent magnet in the sensing head positioned forwardly of said resonant cavity, said permanent magnet having a coaxial opening extending therethrough along its polarized axis, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, and an attenuator means electrically connected to said electronic circuit, said attenuator being positioned between the metallic electrode and said variable energy selector means.

14. A nuclear electromagnetic resonator to detect the electromagnetic energy of the atom in wave frequency form comprising a sensing head, said sensing head having an electromagnetic resonant cavity therein, a permanent magnet in the sensing head positioned forwardly of said resonant cavity, said permanent magnet having a coaxial opening extending therethrough along its polarized axis, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, an electrostatic focusing means arranged in front of said sensing head to receive the incoming energy prior to the sensing head.

15. A nuclear electromagnetic resonator to detect the electromagnetic energy of the atom in wave frequency form comprising a sensing head, said sensing head having an electromagnetic resonant cavity therein, a permanent magnet in the sensing head positioned forwardly of said resonant cavity, said permanent magnet having a coaxial opening extending therethrough along its polarized axis, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, and a space charge bias cut-off means arranged in front of said sensing head and receiving the incoming energy prior to the sensing head.

16. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, an electrostatic field arranged forwardly of said sensing head, said electrostatic field being interposed between the sensing head and the source of energy, and said electrostatic field being polarized in a direction to feed energy into said sensing head.

17. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, an electrostatic field arranged forwardly of said sensing head, said electrostatic field being interposed between the sensing head and the source of energy, and said electrostatic field being polarized in a direction to feed energy into said sensing head, and a polarized potential applied to the electrostatic field to increase signal strength.

18. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, an electrostatic field arranged forwardly of said sensing head, said electrostatic field being interposed between the sensing head and the source of energy, and said electrostatic field being polarized in a direction to feed energy into said sensing head, and deflection means applied to the electrostatic field to permit electrostatic scanning.

19. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, an electrostatic field arranged forwardly of said sensing head, said electrostatic field being interposed between the sensing head and the source of energy, and said electrostatic field being polarized in a direction to feed energy into said sensing head, and deflection means applied to the electrostatic field to permit electrostatic scanning, said deflection means consisting of spaced plates, said spaced plates having alternating potential applied thereto.

20. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, a plate positioned forwardly of the sensing head and spaced therefrom, said plate having an orifice therein aligned with the sensing head, and an adjustable potential means between said plate and the sensing head, a variable resistance in said electronic circuit arranged in series between the detector means and the sensing head.

21. A nuclear electromagnetic resonator to detect the electromagnetic energy of the atom in wave frequency form comprising a sensing head, said sensing head having an electromagnetic resonant cavity therein, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, a variable condenser in said electronic circuit arranged between the detector means and the sensing head, a variable resistance in said electronic circuit arranged in series between the detector means and the sensing head.

22. A nuclear electromagentic resonator to detect the electromagnetic energy of the atom in wave frequency form comprising a sensing head, said sensing head having an electromagnetic resonant cavity therein, a permanent magnet in the sensing head positioned forwardly of said resonant cavity, said permanent magnet having a coaxial opening extending therethrough along its polarized axis, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, and an attenuator means electrically connected to said electronic circuit, said attenuator being positioned between the metallic electrode and said variable energy selector means, and a variable resistance in the electronic circuit positioned between said attenuator and the sensing head, a second variable resistance in said electronic circuit arranged in series between the detector means and the sensing head.

23. A nuclear electromagnetic resonator to detect the electromagnetic energy of the atom in wave frequency form comprising a sensing head, said sensing head having an electromagnetic resonant cavity therein, means in the sensing head to adjust said electromagnetic resonant cavity, an electronic circuit formed of wire leads including a detector means electrically connected to said electronic circuit to detect the wave emitted from the resonator, a variable energy selector means electrically connected to said electronic circuit to select a wave emitted from the resonator, a metallic electrode in the sensing head electrically connected to said electronic circuit to feed said wave frequency into the electronic circuit, a variable resistance in said electronic circuit arranged in series between the detector means and the sensing head.

24. A nuclear electromagnetic resonator to detect the electromagnetic energy of the atom in wave frequency form comprising a sensing head, said sensing head consisting of a barrel, a permanent magnet positioned in one end of the barrel, said magnet having a coaxial opening extending therethrough, a diaphragm positioned at the inner end of the magnet, said sensing head having a resonant cavity therein arranged rearwardly of said diaphragm, and said diaphragm forming one wall of the resonant cavity, a hollow piston in said sensing head, said piston forming another wall of the resonant cavity, said piston having a small nonaxial orifice extending from said resonant cavity into the piston, a metallic electrode extending into the hollow piston and projecting from the sensing head, an electronic circuit formed of wire leads including a detector means electrically connected to said electronic circuit to detect the wave emitted from the resonator, a variable resistance electrically connected to said electronic circuit and arranged between the sensing head and said detector, a second variable resistance in said electronic circuit arranged in series between the detector means and the sensing head.

25. A nuclear electromagnetic resonator to detect the electromagnetic energy of the atom in wave frequency form comprising a sensing head, said sensing head consisting of a barrel, a permanent magnet positioned in one end of the barrel, said magnet having a coaxial opening extending therethrough, a diaphragm positioned at the inner end of the magnet, said sensing head having a resonant cavity therein arranged rearwardly of said diaphragm, and said diaphragm forming one wall of the resonant cavity, a hollow piston in said sensing head, said piston forming another wall of the resonant cavity, said piston having a small nonaxial orifice extending from said resonant cavity into the piston, a metallic electrode extending into the hollow piston and projecting from the sensing head, an electronic circuit formed of wire leads including a detector means electrically connected to said electronic circuit to detect the wave emitted from the resonator, a variable resistance electrically connected to said electronic circuit and arranged between the sensing head and said detector, and a variable condenser in said electronic circuit, the variable condenser being arranged between the detector and the sensing head and on the return side of the circuit from the detector to the sensing head.

26. A nuclear electromagnetic resonator to detect the electromagnetic energy of the atom in wave frequency form comprising a sensing head, said sensing head consisting of a barrel, a permanent magnet positioned in one end of the barrel, said magnet having a coaxial opening extending therethrough, a diaphragm positioned at the inner end of the magnet, said sensing head having a resonant cavity therein arranged rearwardly of said diaphragm, and said diaphragm forming one wall of the resonant cavity, a hollow piston in said sensing head, said piston forming another wall of the resonant cavity, said piston having a small nonaxial orifice extending from said resonant cavity into the piston, a metallic electrode extending into the hollow piston and projecting from the sensing head, an electronic circuit formed of wire leads including a detector means electrically connected to said electronic circuit to detect the wave emitted from the resonator, a variable resistance electrically connected to said electronic circuit and arranged between the sensing head and said detector, and an electrostatic focusing means positioned in front of said sensing head through which the wave frequency first passes before entering the sensing head.

27. A nuclear electromagnetic resonator to detect the electromagnetic energy of the atom in wave frequency form comprising a sensing head, said sensing head consisting of a barrel, a permanent magnet positioned in one end of the barrel, said magnet having a coaxial opening extending therethrough, a diaphragm positioned at the inner end of the magnet, said sensing head having a resonant cavity therein arranged rearwardly of said diaphragm, and said diaphragm forming one wall of the resonant cavity, a hollow piston in said sensing head, said piston forming another wall of the resonant cavity, said piston having a small nonaxial orifice extending from said resonant cavity into the piston, a metallic electrode extending into the hollow piston and projecting from the sensing head, an electronic circuit formed of wire leads including a detector means electrically connected to said electronic circuit to detect the wave emitted from the resonator, a variable resistance electrically connected to said electronic circuit and arranged between the sensing head and said detector, and a variable condenser in said electronic circuit, the variable condenser being arranged between the detector and the sensing head and on the return side of the circuit from the detector to the sensing head, and an electrostatic focusing means positioned in front of said sensing head through which the wave frequency first passes before entering the sensing head.

References Cited in the file of this patent

UNITED STATES PATENTS

| | | |
|---|---|---|
| 2,498,461 | Skellett | Feb. 21, 1950 |
| 2,573,870 | Pfund | Nov. 6, 1951 |
| 2,720,593 | Richards et al. | Oct. 11, 1955 |
| 2,749,443 | Dicke et al. | June 5, 1955 |
| 2,808,510 | Norton | Oct. 1, 1957 |
| 2,837,693 | Norton | June 3, 1958 |
| 2,879,439 | Townes | Mar. 24, 1959 |
| 2,901,700 | Bolie | Aug. 25, 1959 |
| 2,929,922 | Schawlow et al. | Mar. 22, 1960 |

FOREIGN PATENTS

| | | |
|---|---|---|
| 476,246 | Canada | Aug. 21, 1951 |